H. C. SMITH.
MACHINE FOR MEASURING AND TESTING CORSETS.
APPLICATION FILED FEB. 1, 1915.
1,207,232.
Patented Dec. 5, 1916.
3 SHEETS—SHEET 1.
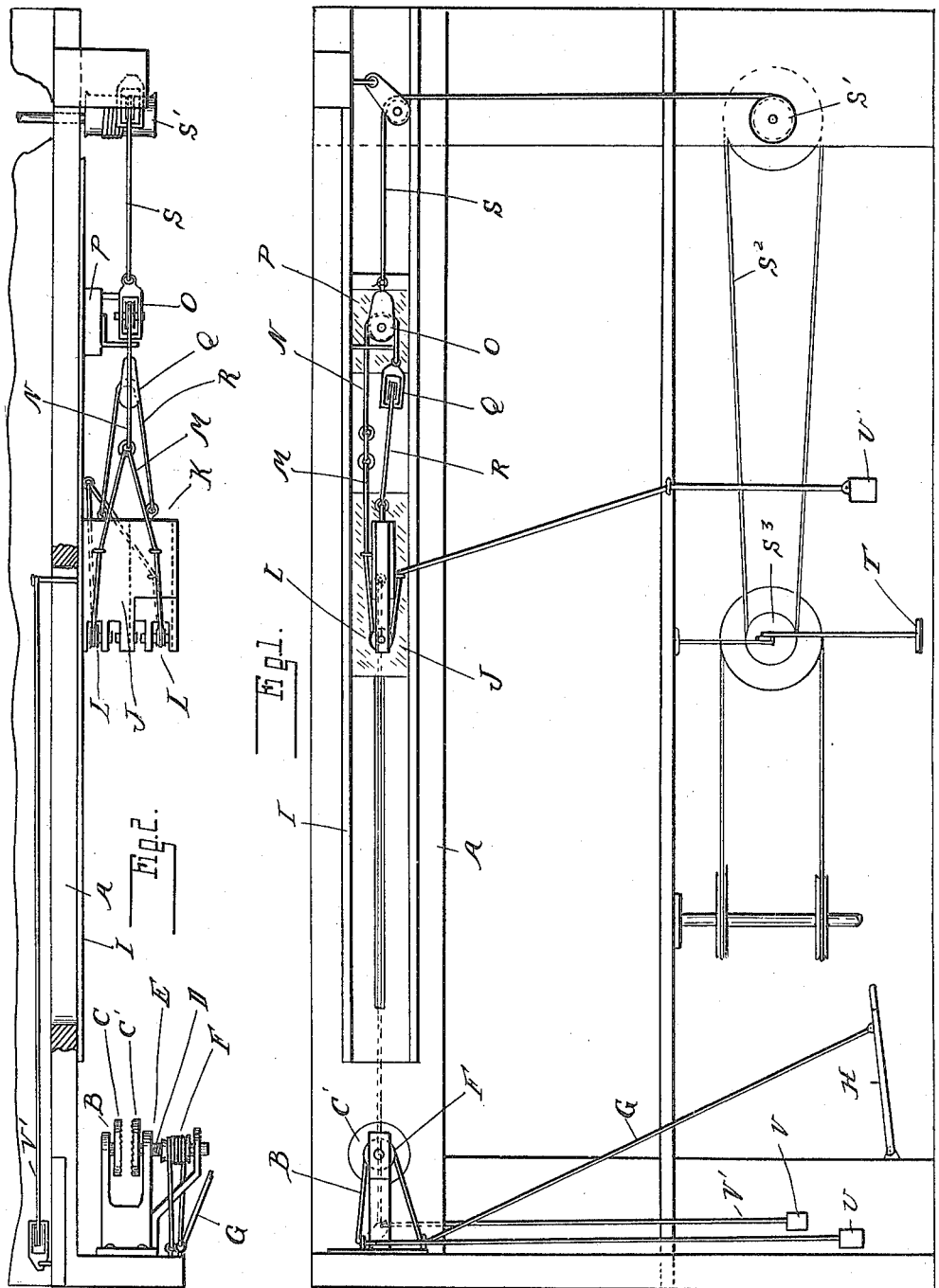
Witnesses
Inventor
Herbert Cushing Smith H. C. SMITH.
MACHINE FOR MEASURING AND TESTING CORSETS.
APPLICATION FILED FEB. 1, 1915.
1,207,232.
Patented Dec. 5, 1916.
3 SHEETS—SHEET 2.
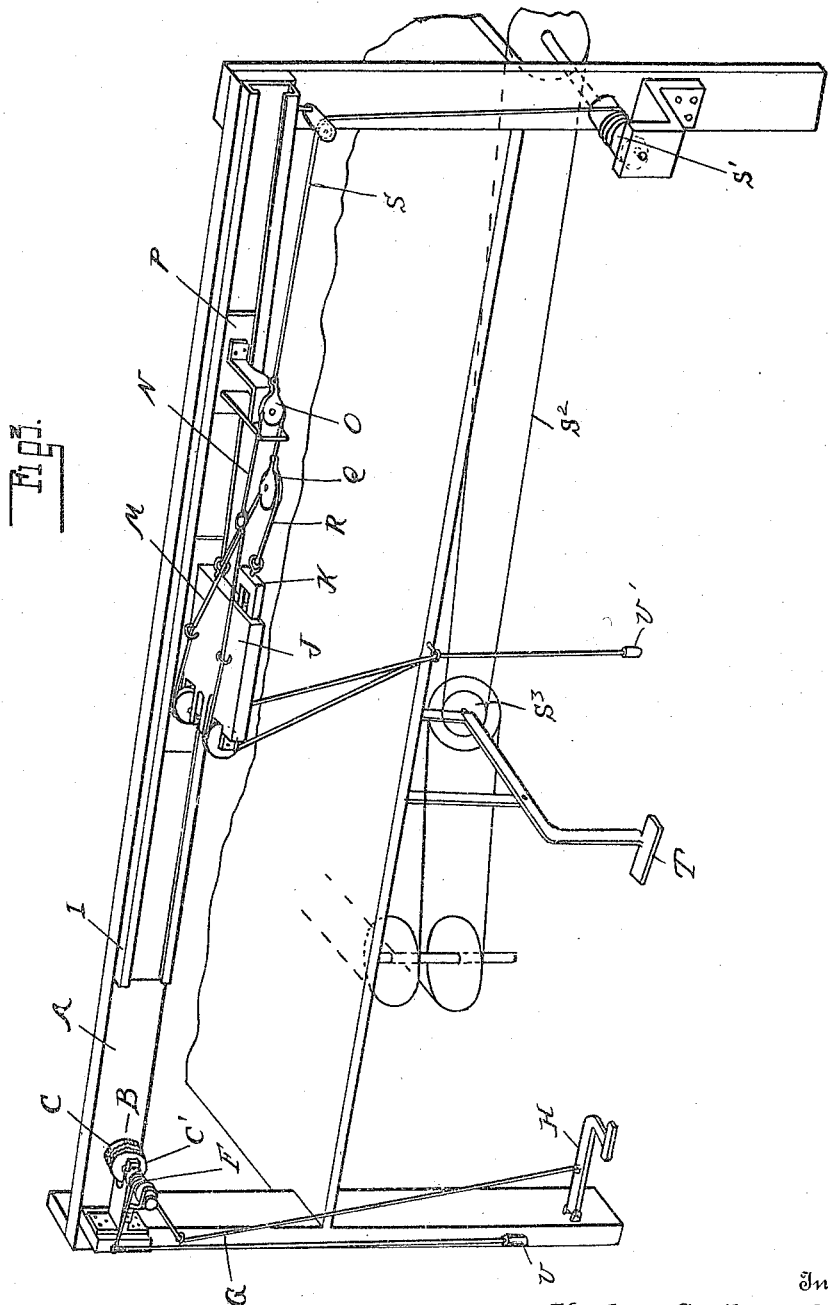
Inventor
Herbert Cushing Smith
Witnesses
W. K. Ford
James P. Barry
By Whittemore Hulbert & Whittemore
Attorneys H. C. SMITH.
MACHINE FOR MEASURING AND TESTING CORSETS.
APPLICATION FILED FEB. 1, 1915.
1,207,232.
Patented Dec. 5, 1916.
3 SHEETS—SHEET 3.
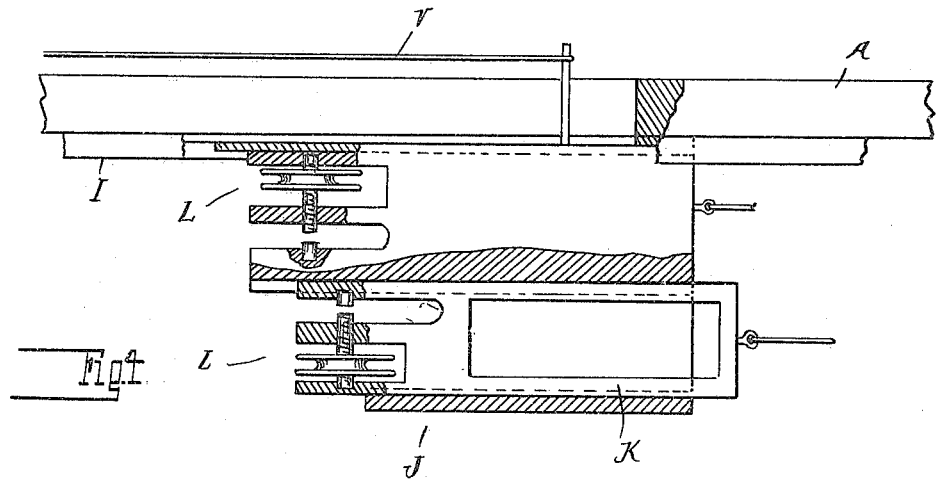
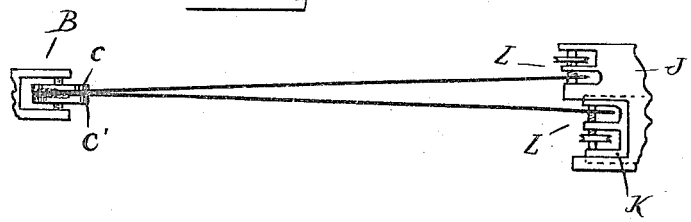
Inventor
Herbert Cushing Smith
Witnesses
W. K. Ford
James P. Barry
By Whittemore Hulbert & Whittemore
Attorneys

UNITED STATES PATENT OFFICE.

HERBERT CUSHING SMITH, OF DETROIT, MICHIGAN, ASSIGNOR TO AMERICAN LADY CORSET COMPANY, OF DETROIT, MICHIGAN, A CORPORATION OF MICHIGAN.

MACHINE FOR MEASURING AND TESTING CORSETS.

1,207,232.           Specification of Letters Patent.      Patented Dec. 5, 1916.

Application filed February 1, 1915. Serial No. 5,404.

*To all whom it may concern:*

Be it known that I, HERBERT CUSHING SMITH, a citizen of the United States of America, residing at Detroit, in the county of Wayne and State of Michigan, have invented certain new and useful Improvements in Machines for Measuring and Testing Corsets, of which the following is a specification, reference being had therein to the accompanying drawings.

The invention relates to the manufacture of corsets, and it is the object of the invention to provide a testing machine, by means of which two complementary sections or halves of the corset may be tested for equality, straightness and symmetry. By strightness is meant that when the corset is worn a plane passed through the intersection of the hooked members, known in the manufacture as the "front clasps" or "front steels," and also passing through the spinal column when in an upright position (assuming perfect alinement of the spinal column) shall be vertical.

In the present state of the art, the testing of corset sections or halves is usually performed by hand, the common method being for the tester to hold corresponding edges of the sections or halves in alinement in one hand, and by then drawing upon the opposite sections or halves with the other hand, determining whether they are of equal width and symmetrical throughout. The accuracy of the test depends upon the skill of the operator, and small irregularities cannot be easily detected. With the present invention the sections or halves may be accurately tested and without requirement of special skill on the part of the workman.

In the drawings: Figure 1 is an elevation of the machine; Fig. 2 is a plan view thereof; Fig. 3 is a perspective view; Fig. 4 is a sectional plan view showing the movable head and clamping devices; and Fig. 5 is a diagram illustrating the manner of testing the corset.

My improved machine comprises essentially means for clamping or otherwise holding two of the corresponding edges of the sections or halves in alinement with each other, together with means for individually engaging the other two edges of the sections or halves and putting these sections or halves under equal tension. To facilitate the rapid manipulation of the machine, I preferably provide pedal-operated clamps for engaging the sections so as to leave the operator's hands free. This permits of quickly placing the sections in the machine and removing them after testing. With the specific construction shown, A is a suitable frame work, upon which is mounted a clamping device B preferably comprising a pair of swiveled disks C and C', the latter being mounted on a threaded stem D which engages a corresponding threaded bearing E and may be revolved by a pulley F and flexible strand G leading to a pedal H.

I is a guideway upon the frame A in which is slidably supported a movable head J. In this head is an independently slidable member K, each of which part is provided with means for engaging one of the corset sections or halves. As shown, the engaging means comprises clamps L similar in construction to the clamps B and operated by flexible strands M connected to a common strand N passing over a pulley O upon a sliding block P in the guides I. The opposite end of the strand N is connected to a pulley Q, around which is passed a flexible strand R, which has its opposite ends connected respectively to the parts J and K.

S is a flexible strand connected to the block P and extending to a suitable operating device, such as the drum S' operated by a belt S² from a clutch S³ controlled by a pedal T.

With the construction as described, the clamps are held normally in open position by counterweights U U' connected to the opposite ends of the strands G and N, while the block J is drawn back by a counterweight V and strand V'. Thus the parts are in position for engagement of a pair of corset sections or halves to be tested. In performing the test the operator places the two alined edges of the sections between the disks C and C' of the clamp B and then pressing upon the pedal H effects the clamping. The opposite edges of the sections are respectively engaged with the clamps L of the independently movable sections J and K, after which pressure is placed upon the pedal T, thus operating the clutch S³, belt S² and drum S', this drawing upon the strand S which will actuate the sliding block P, which in turn will draw upon the strands M and N, the latter operating the clamps L for the respective sections or halves. As soon as these clamps are tightened a further pressure on the pedal will draw upon the loop-shaped strand R which passes about the pulley Q and which at its opposite ends is attached to the independently-movable members J and K. The pulley will equalize the stress upon the two sections of the strand and consequently an equal tension is placed upon each section or half of the corset. Thus if one section or half is of greater width than the other its edge will be drawn beyond that of the shorter section, and if there is any lack of symmetry in the sections when placed under tension their free edges will draw into angular relation to each other. Thus at a glance the operator can determine whether or not the sections are equal and symmetrical, and where they are not they may be suitably marked and returned for correction.

By means of my improved machine an operator may perform the work of several testing by hand, and with greater accuracy and without special skill.

What I claim as my invention is:—

1. A corset testing machine, comprising means for engaging alined edges of the complementary sections, and means for individually engaging the opposite edges of said sections and for simultaneously placing an equal tension thereupon.

2. A corset testing machine, comprising means for engaging alined edges of complementary corset sections, means for individually engaging the opposite edges of said sections, tensioning means, and means for equalizing the tension upon the complementary sections.

3. A corset testing machine, comprising means for engaging alined edges of complementary corset sections, means for individually engaging the opposite edges of said sections, a pedal-controlled member for relatively moving the engaging means for the opposite edges of the sections, and an equalizing connection between the individual engaging means for said sections.

4. A machine for testing corsets, comprising a frame, a pedal-operated clamp upon said frame for engaging alined edges of complementary corset sections, a slidable member mounted on said frame, engaging devices upon said slidable member for individually engaging the opposite edges of said complementary sections, an equalizing connection between said individual engaging devices, and a pedal for operating said slide and for placing an equal tension upon said sections.

5. A corset testing machine, comprising a frame, a clamp mounted on said frame for engaging alined edges of the complementary corset sections, a pedal for tightening said clamp, a pair of devices for individually engaging the opposite edges of said sections, pedal-actuated means for drawing upon said individual engaging devices, and equalizing means for the tension thereon.

6. A corset testing machine, comprising means for engaging the opposite edges of a corset section, tensioning means therefor, means for engaging and applying tension to a complementary section, and means for equalizing the tension upon said first-mentioned section with that applied to said complementary section.

7. A corset testing machine, comprising means for engaging alined edges of the complementary sections, means for individually engaging the opposite edges of said sections and for placing tension thereupon, upon the travel of said last-mentioned means in one direction, and means automatically operating in the opposite direction to return the parts to their original positions.

8. A corset testing machine, comprising means for engaging alined edges of complementary corset sections, means for individually engaging the opposite edges of said sections, and a common means for actuating the means individually engaging the opposite edges and for exerting tension upon the complementary sections.

9. A corset testing machine, comprising means for simultaneously individually clamping corresponding edges of complementary corset sections, tensioning means attached to said clamping means, and means for equalizing the tension upon the complementary sections.

10. A corset testing machine, comprising means for engaging the opposite edges of complementary corset sections, tensioning means for said complementary corset sections, and means for equalizing the tension upon the complementary sections independent of variation in size thereof and permitting of independent movement thereof.

In testimony whereof I affix my signature in presence of two witnesses.

HERBERT CUSHING SMITH.

Witnesses:
 JAMES P. BARRY,
 HENRI E. BOWMAN.

Copies of this patent may be obtained for five cents each, by addressing the "Commissioner of Patents, Washington, D. C."